United States Patent [19]

DePue et al.

[11] Patent Number: 5,447,325
[45] Date of Patent: Sep. 5, 1995

[54] HIGH MOBILITY SUSPENSION SYSTEM

[75] Inventors: Steve DePue; Don Stoesz, both of Calgary, Canada

[73] Assignee: Standen's Limited, Calgary, Canada

[21] Appl. No.: 207,538

[22] Filed: Mar. 7, 1994

[51] Int. Cl.⁶ .................................. B60G 3/00
[52] U.S. Cl. ................................ 280/699; 280/789; 280/718
[58] Field of Search ............. 280/699, 718, 720, 789

[56] References Cited

U.S. PATENT DOCUMENTS

| | | | |
|---|---|---|---|
| 2,861,811 | 11/1958 | Lassen | 280/789 |
| 3,053,548 | 9/1962 | Moore | 280/699 |
| 3,767,223 | 10/1973 | Bottenberg | 280/789 |
| 5,251,886 | 10/1993 | Bursel | 280/699 |

FOREIGN PATENT DOCUMENTS 166147  2/1959  Sweden ............... 280/699

*Primary Examiner*—Kenneth R. Rice
*Attorney, Agent, or Firm*—Bachman & LaPointe

[57] ABSTRACT

The present invention relates to a high mobility suspension system for vehicles travelling in a harsh off-road environment. In particular, the suspension system can be mounted on a trailer and consists of a cam mounted on a cam shaft for variably deflecting a leaf spring that is mounted to the frame of the trailer. A swing arm is connected between the axle of the wheel and the cam shaft, such that when the trailer is loaded the wheel is deflected which in turn pivots the swing arm and causes the cam shaft to rotate. As the cam shaft rotates the cam deflects the leaf spring based on a ratio of the actual direct trailer loading. The load rate of the suspension system can be customized by modifying the configuration of the cam member and the swing arm to achieve either a linear, progressive or digressive load rate, or any combination of these rates. The present invention enables the trailer to have a compliant load rate yet maintain a compact suspension design by reducing the spring deflection requirements.

26 Claims, 5 Drawing Sheets

HIGH MOBILITY SUSPENSION SYSTEM

FIELD OF THE INVENTION

This invention relates to the field of vehicle suspension systems, and more particularly to high mobility suspension systems for trailers that are towed in harsh off-road environments.

BACKGROUND OF THE INVENTION

Trailers that are towed by a vehicle in harsh off-road environments are placed under an extreme amount of stress. Trailers that are subjected to high levels of stress must be capable of withstanding the intense motion imparted to the trailer and to the coupling mechanism between the tow vehicle and trailer.

It is the actual suspension system of the trailer that greatly affects the stability of the trailer when towed by a car or truck in a rough, high speed, off-road situation.

Traditional trailer designs use a direct load transfer type of suspension system. With this type of system the load bearing on the trailer is transferred directly to a flexible member, such as a leaf or coil spring. Consequently, with direct load transfer the entire load must be absorbed through the deflection of the flexible member.

The most common suspension designs that utilize direct load transfer are:

(a) beam axles having two semi-elliptic springs fastened to hangers at the front and with shackles or slippers at the rear of the spring; or (b) trailing arm suspensions, or "neidhart" type suspensions that use rubber cords in compression as the springing medium.

The problem with these prior art direct load transfer systems relates to the inherent design compromises between load rate and spring size.

The load rate of a suspension system relates to the stiffness and is defined as the change in load divided by the change in deflection. The units of load rate are, for example, kg/cm or lbs/in., where 1 kg/cm = 5.6007 lbs/in.

The three most common types of load rates are:

(a) Linear: the load rate is constant throughout the deflection cycle; that is, the change in deflection of the flexible member per unit load change is constant as the flexible member is deflected, or stressed;

(b) Progressive: the load rate increases throughout the deflection cycle; that is, the change in deflection of the flexible member per unit load change decreases as the flexible member is deflected, resulting in an increasing load rate; and (c) Digressive: the load rate decreases throughout the deflection cycle; that is, the change in deflection of the flexible member per unit load change increases as the flexible member is deflected, resulting in a decreasing load rate.

Traditionally, the load rate of the trailer suspension ($LR_t$) exceeds the load rate of the tow vehicle suspension ($LR_v$) resulting in high levels of trailer instability when operated in a harsh off-road environment. It is not uncommon for the coupling between the trailer and the tow vehicle to be sheared off in certain situations based on the additional forces exerted on the coupling due to the extreme relative motion between the tow vehicle and the trailer imparted by bumps etc.

Currently, the only way to overcome this instability problem is by making the trailer suspension more compliant than the tow vehicle suspension. A trailer is said to be more compliant than the tow vehicle when the trailer load rate is lower than the tow vehicle load rate. If such a design is effected, the trailer having the lower load rate, will be able to overcome, to a certain extent, the added loads transmitted through the coupling mechanism.

However, if the load rate of the trailer suspension is lowered to make it more compliant a very large spring would be necessary to accommodate the additional deflection requirements based on a given load. In particular, the spring must be extremely long so as not to be over stressed.

In summary, there are currently two load rate configurations available with direct load transfer suspension systems:

(a) a stiff suspension for the trailer, whereby the load rate of the trailer exceeds the load rate of the tow vehicle ($LR_t > L_v$), i.e. a non-compliant suspension arrangement:

EXAMPLE 1

| Load Rates: | $LR_v$ = 200 kg/cm (1120 lbs/in) |
| --- | --- |
| | $LR_t$ = 300 kg/cm (1680 lbs/in) |
| | Both load rates are linear. |
| LOAD ON TRAILER | TRAILER SPRING DEFLECTION |
| 2500 kg | 8.3 cm |
| (5513 lbs) | (3.3 in) |
| 3600 kg | 12 cm |
| (7938 lbs) | (4.7 in) |
| 4500 kg | 15 cm |
| (9923 lbs) | (5.9 in) |

(b) a trailer load rate below the load rate of the tow vehicle ($LR_t < L_v$), i.e. a compliant suspension arrangement:

EXAMPLE 2

| Load Rates: | $LR_v$ = 200 kg/cm (1120 lbs/in) |
| --- | --- |
| | $LR_t$ = 175 kg/cm (980 lbs/in) |
| | Both load rates are linear. |
| LOAD ON TRAILER | TRAILER SPRING DEFLECTION |
| 2500 kg | 14.3 cm |
| (5513 lbs) | (5.6 in) |
| 3600 kg | 20.6 cm |
| (7938 lbs) | (8.1 in) |
| 4500 kg | 25.7 cm |
| (9923 lbs) | (10.1 in) |

Consequently, the trailer spring of Example 2 must be able to deflect an additional 6 cm (2.4 in) under a 2500 kg (5513 lbs) load, and an additional 10.7 cm (4.2 in) under a 4500 kg (9923 lbs) load, as compared with the non-compliant suspension of Example 1. As a result, although the suspension of Example 2 is compliant, the spring would have to be much larger merely to accommodate standard loading forces with the increased deflection.

Therefore, based on the above examples, a design compromise exists between a stiff/non-compliant trailer suspension on one hand and a compliant/large spring requirement on the other hand.

Neither of the above situations is appropriate for off-road environments. Consequently, there is a need for a suspension system that can be used on a trailer such that the trailer suspension load rate is compliant compared with the load rate of the tow vehicle without requiring large springs to accommodate all of the deflection when the trailer is either statically or dynamically loaded.

SUMMARY OF THE INVENTION

An object of the preferred embodiment of the present invention is to provide a suspension system for vehicles that is capable of reducing the direct load transfer to the spring of the vehicle suspension system.

In accordance with one aspect of the invention there is provided a suspension apparatus for a wheel of a vehicle having a frame and a flexible member connected to the frame, said suspension apparatus comprising: wheel deflection means for deflecting the wheel in an arcuate path when a predetermined load is applied to the vehicle; and flexible member deflection means interconnectable to the wheel deflection means for deflecting the flexible member when the wheel moves along said arcuate path.

In accordance with another aspect of the invention there is provided a suspension apparatus for a wheel of a vehicle having a frame and a flexible member connected to the frame, said suspension apparatus comprising: shaft means rotatably mounted to the frame; contact means connected to the shaft and positioned to deflect the flexible member when the vehicle is loaded; and swing member means pivotally connected to the shaft at one end and adapted to connect to an axle of the wheel of the vehicle at the other end, such that when the vehicle is subjected to a load the wheel is deflected which causes the swing member means to rotate the shaft means such that the contact means deflects the flexible member.

In the preferred form of the invention, the shaft means includes a rod mounted to the frame by a pair of bearing mounts, such that the rod can rotate about its longitudinal axis.

The load rate of the vehicle suspension can be customized by modifying the contact means, for example a cam member, to include surfaces of varying orientation.

The advantages of the suspension system of the present invention include being able to customize the ratio transfer of the suspension load such that a very compact spring can be used in a compliant trailer design.

BRIEF DESCRIPTION OF THE DRAWINGS

Embodiments of the invention will be described by way of example in conjunction with the drawings in which.

DETAILED DESCRIPTION OF PREFERRED EMBODIMENTS OF THE INVENTION

The preferred suspension systems of the present invention will be discussed in conjunction with a trailer that is designed to be towed behind a powered vehicle. However, the suspension systems can also be readily adapted to the actual powered vehicle.

Figure 1:
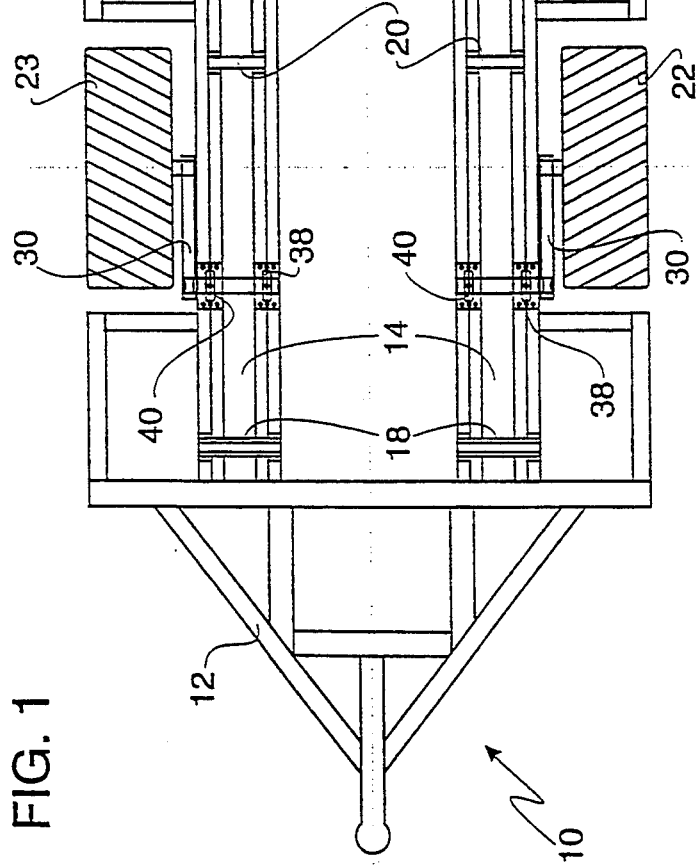
FIG. 1 illustrates a top plan view of a trailer incorporating the suspension system of the present invention.
Figure 2:
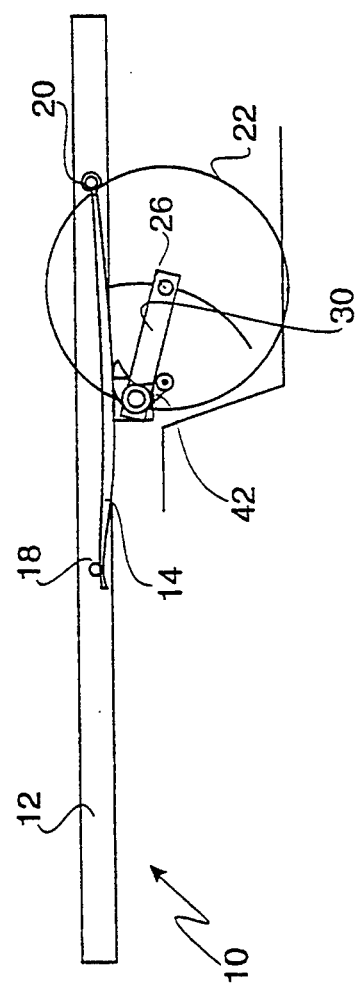
FIG. 2 illustrates a side view of the trailer of FIG. 1, showing the suspension system for one of the wheels.

FIGS. 1 and 2 show a trailer 10 that includes a support frame 12 which is designed to accommodate a container unit (not shown) for carrying loads. The trailer 10 includes two wheels 22 and 23 each of which is independently interconnected to separate suspension components.

The detailed description of the suspension components proceeds on the basis of wheel 22, and it is understood that the suspension components apply identically to wheel 23 of the trailer 10. However, in certain situations it may be necessary to design the trailer 10 with different suspension load rates on each side based on the loading expectations of the trailer 10. For example, in a two wheeled trailer, one wheel may employ a linear load rate while the other wheel may employ a progressive load rate.

A leaf spring 14 is mounted to the frame 12 by means of a front mounting 18 and a rear mounting 20. The wheel 22 is mounted on an axle 26. One end of the axle 26 is connected to swing arm 30. The opposite end of the swing arm 30 is fixed to a cam shaft 34, which is mounted to the support frame 12 by way of bearing mounts 38 and 40. The bearing mounts 38 and 40 allow the cam shaft 34 to rotate about its own longitudinal axis.

Figure 3:
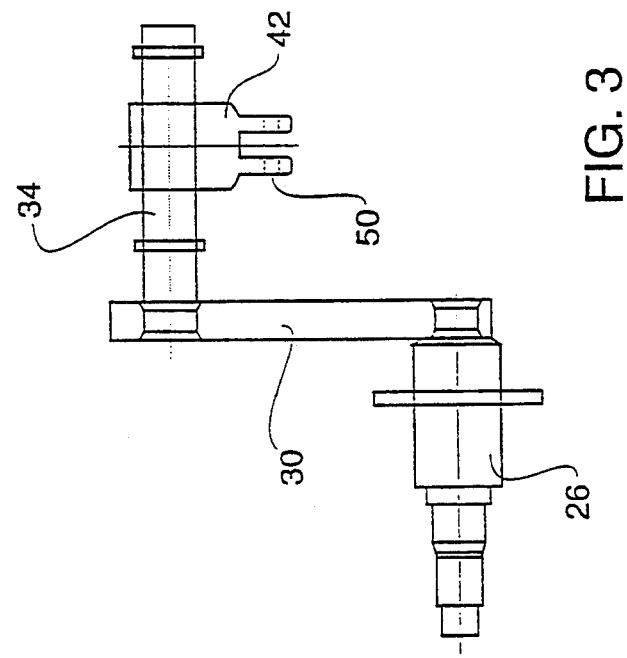
FIG. 3 illustrates a top plan view of the components of the suspension system connected to an axle of a wheel as separated from the trailer and wheel.

A cam member 42 is fixed to the cam shaft 34 which swings into engagement with the leaf spring 14 due to the pivotal movement of the swing arm 30 that imparts a rotational movement on the cam shaft 34. Refer to FIG. 3 for an enlarged view of the suspension components as mounted on the trailer 10 shown in FIGS. 1 and 2.

Figure 4:
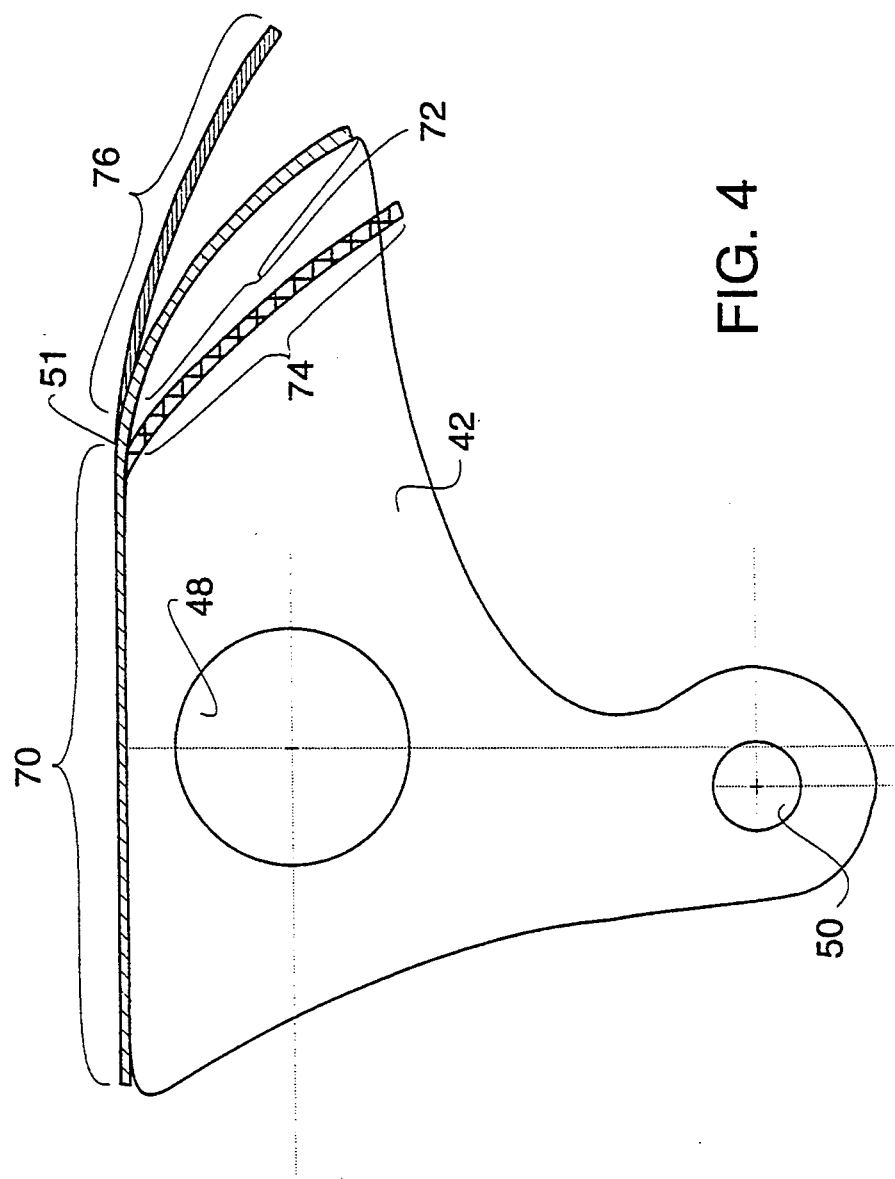
FIG. 4 illustrates a plan view of a cam member of the suspension system shown in FIG. 3 that can achieve a linear load rate; shadow lines illustrate an example of a cam profile used to achieve progressive and digressive load rates.

FIG. 4 shows an enlarged view of the cam member 42 having a spring engaging surface 51 and a cam shaft mounting aperture 48 for receiving the cam shaft 34. The spring engaging surface 51 has a substantially flat portion 70 and a generally curving portion 72. The surface 51 having portions 70 and 72 can achieve, dependant on the configuration of the swing arm 30, a generally linear load rate.

Curving portions 74 and 76 are suitable for achieving a digressive and progressive load rate respectively.

Figure 6:
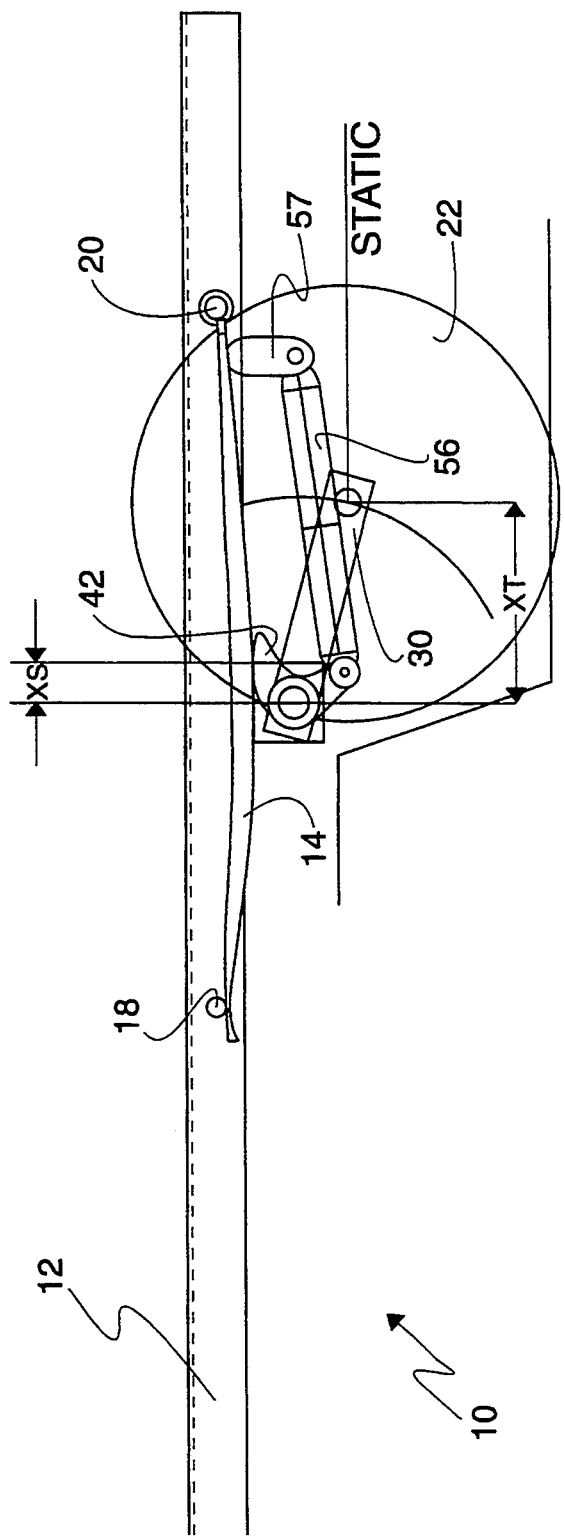
FIG. 6 illustrates a side view of the trailer of FIG. 1, with a shock absorber added to the suspension system.

The cam member 42 may also include a shock mounting aperture 50. (FIG. 6 provides further details of the shock mounting)

Consequently, as illustrated in FIG. 4, the load rate values and type of load rate (i.e. linear, progressive, digressive) of the trailer 10 suspension system are dependent on the specific configuration of the cam member 42, and also the configuration (length and orientation) of the swing arm 30. In particular, the shape of the spring engaging surface 51 greatly effects the amount of spring deflection for a given load.

Figure 5:
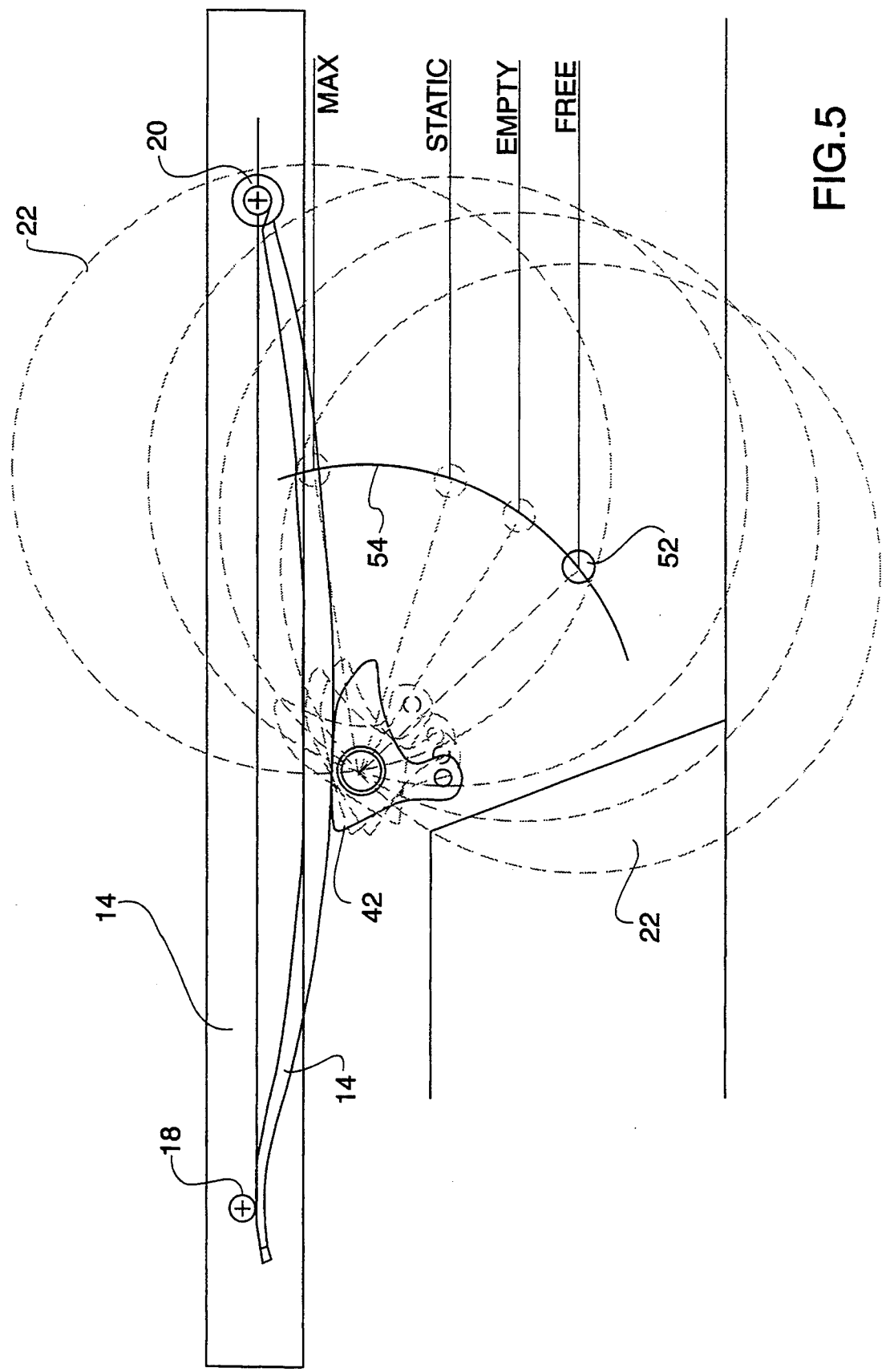
FIG. 5 illustrates a side schematic view of the suspension system at various stages of load.

In operation, as most clearly shown in FIG. 5, center 52 of wheel 22 moves along an arcuate path 54 when the trailer 10 is subjected to a load. The center 52 of wheel 22 moves along such a path because of the pivotal relationship between swing arm 30 and the cam shaft 34. As the center 52 of wheel 22 progressively moves along path 54 the cam shaft 34 rotates about its own axis which in turn causes the cam member 42 to engage and deflect the leaf spring 14, as shown by the shadow lines of cam member 42 rotating about the axis of cam shaft 34.

The cam member 42 shown in FIG. 5 has the same spring engaging surface 51 and curved portion 72 as shown in FIG. 4. Therefore, under the mounting conditions shown in FIG. 5, the load rate of the suspension of trailer 10 would be linear. That is, the load rate would be constant throughout the deflection cycle.

More particularly, in the position marked "FREE" the cam 42 is in complete disengagement of the leaf spring 14. In the position marked "EMPTY" the cam 42 is resting against the leaf spring 14 due to the weight of the trailer 10 itself. In the "EMPTY" position a combination of the flat portion 70 and curved portion 72 of the surface 51 of cam 42 is in contact with the leaf spring 14.

The position marked "STATIC" indicates the situation where the trailer 10 is partially loaded and is not being subject to dynamic loading. In this situation, the swing arm 30 pivots about the cam shaft 34 resulting in the center 52 of the wheel 22 moving upwardly, along the path 54, and also results in the cam 42 depressing the leaf spring 14. In the "STATIC" position the cam 42 has rotated such that only the curved portion 72 of surface 51 of cam 42 is in contact with the leaf spring 14.

Under maximum load conditions, such as when the trailer 10 traverses a large bump, the center 52 of wheel 22 pivots to the position marked "MAX" with the cam member 42 fully depressing the leaf spring 14. In the "MAX" position the cam 42 has rotated to such an extent that the extreme end of the curved portion 72 of surface 51 of cam 42 is now in contact with the leaf spring 14.

The linearity of the load rate, as previously discussed, is partly dependent on the engaging surface 51. Therefore, if the cam 42 having curving portion 74 of FIG. 4 was used on the trailer 10, shown in FIG. 5 without any other modifications, the load rate of the suspension would actually increase as the trailer 10 is loaded sequentially from the "FREE" to "EMPTY" to "STATIC" and finally to the "MAX" loading positions.

Similarly, if the cam 42 having curving portion 76 of FIG. 4 was used on the trailer 10, shown in FIG. 5 without any other modifications, the load rate of the suspension would actually decrease as the trailer 10 is loaded sequentially from the "FREE" to "EMPTY" to "STATIC" and finally to the "MAX" loading positions.

Consequently, when the trailer 10 is subjected to a load, the force caused by the load is translated through the cam shaft 34 to the cam member 42. The cam member 42 acts against the leaf spring 14, which in turn absorbs the energy required to maintain the trailer 10 in a suspended position.

As a result of the swing arm 30 being pivotally connected to the cam shaft 34 the wheel 22 is also deflected upwardly when the trailer 10 is subjected to a load. The suspension system of the present invention reduces the traditional direct load transfer to the leaf spring 14 based on a ratio load transfer by using the swing arm 30 and cam member 42.

The ratio transfer suspension of the present invention allows the trailer 10 to have a compliant load rate, that is a load rate lower than the tow vehicle load rate, yet does not require a spring having an overly large travel, i.e. a very stiff spring can be used yet a compliant rate can be maintained. This is accomplished by the swing arm 30 that allows the wheel 22 to move relative to the plane of the trailer 10 and by the cam member 42 which depresses the leaf spring 14 based on a ratio of the actual loading.

Referring to FIG. 6, the relationship between suspension load and tire load (or trailer load for single axle arrangements) is defined as: XT/XS (tire center/cam arm ratio) = suspension load/tire load.

Example A shows the conventional loading arrangements (non-compliant and compliant) previously discussed. In these conventional direct load transfer suspensions the XT/XS ratio is equal to one. Therefore, the suspension load is equal to the tire/trailer load, and the entire suspension load is to be absorbed in spring deflection. Consequently, a 2500 kg (5513 lbs) load on the compliant trailer arrangement translates into a 14.3 cm (5.6 in) spring deflection (2500 kg/175 kg/cm).

The ratio load transfer suspension of the present invention has an XT/XS ratio that is greater than one. In the case of Example A, the ratio is 4:1. As a result, the suspension load is 10,000 kg (22050 lbs) for a trailer/tire load of 2500 kg (5513 lbs) or 4×2500 kg (5513 lbs).

This 10,000 kg (22050 lbs) suspension load is distributed between tire deflection and spring deflection in the same 4:1 ratio. Therefore, the spring in the ratio load transfer arrangement is required to deflect approximately 20% of the entire suspension load, in this example, 2000 kg (4410 lbs), or 11.4 cm (4.5 in) of spring travel. This is a significant improvement over the 14.3 cm (5.6 in) deflection requirement in an identical direct load arrangement of the prior art.

Example A clearly illustrates that the traditional suspension design trade-off of compliance with spring size is obviated by the present invention. All of the load rates recited in Example A are linear.

Although the ratio transfer system increases the amount of overall suspension load due to the swing arm 30 geometry, it decreases the amount of deflection the spring 14 must withstand due to the distribution of suspension load to both tire and spring deflection as illustrated in FIG. 5.

EXAMPLE A

| Traditional Direct Load Transfer Suspension | |
|---|---|
| Type 1: Non-Compliant | |
| Load Rates: | $LR_y$ = 200 kg/cm (1120 lbs/in) |
| | $LR_t$ = 300 kg/cm (1680 lbs/in) |
| LOAD ON TRAILER | TRAILER SPRING DEFLECTION |
| 2500 kg (5513 lbs) | 8.3 cm (3.3 in) |
| 3600 kg (7938 lbs) | 12 cm (4.7 in) |
| 4500 kg (9923 lbs) | 15 cm (5.9 in) |
| Type 2: Compliant | |
| Load Rates: | $LR_y$ = 200 kg/cm (1120 lbs/in) |
| | $LR_t$ = 175 kg/cm (980 lbs/in) |
| LOAD ON TRAILER | TRAILER SPRING DEFLECTION |
| 2500 kg (5513 lbs) | 14.3 cm (5.6 in) |

-continued

| | |
|---|---|
| 3600 kg | 20.6 cm |
| (7938 lbs) | (8.1 in) |
| 4500 kg | 25.7 cm |
| (9923 lbs) | (10.1 in) |

Ratio Load Transfer Suspension

Type: Compliant

Load Rates: $LR_v$ = 200 kg/cm (1120 lbs/in)
$LR_t$ = 175 kg/cm (980 lbs/in)

| LOAD ON TRAILER | SPRING LOAD XT/XS = 4 | TRAILER SPRING DEFLECTION |
|---|---|---|
| 2500 kg | 2000 kg | 11.4 cm |
| (5513 lbs) | (4410 lbs) | (4.5 in) |
| 3600 kg | 2880 kg | 16.5 cm |
| (7938 lbs) | (6350 lbs) | (6.5 in) |
| 4500 kg | 3600 kg | 20.6 cm |
| (9923 lbs) | (7938 lbs) | (8.1 in) |

In summary, a trailer 10 designed with the ratio load transfer suspension of the present invention can be compliant, that is the load rate of the trailer is less then the load rate of the tow vehicle, and can utilize smaller springs than traditional designs since the spring deflection requirements have been reduced. In addition, the load rate and the XT/XS ratio of the suspension can be easily customized by modifying either the cam 42 design or the swing arm 30 and cam 42 geometry. For example, the swing arm 30 and cam 42 can be designed to achieve XT/XS ratios in the range of 20:1; thereby enabling large wheel deflections and compact spring designs in a compliant trailer arrangement.

FIG. 6 illustrates the trailer 10 having a shock absorber 56 connected between the cam member 42 and a mounting plate 57 fixed to the frame 12 of the trailer 10. The shock absorber 56 provides additional damping to the trailer 10 in extremely dynamic environments.

Figure 7:
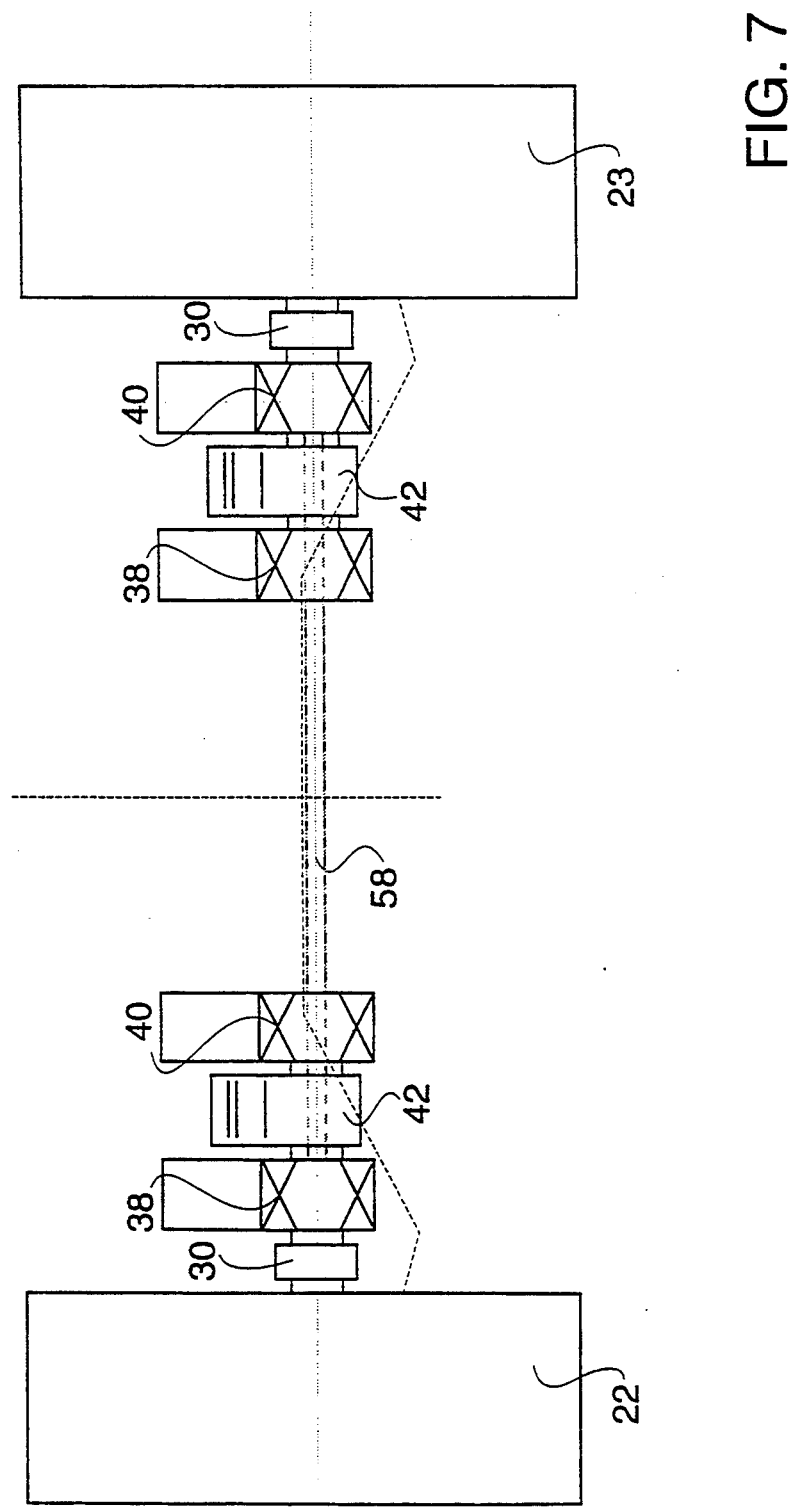
FIG. 7 illustrates a rear view of a trailer incorporating the suspension system of the present invention with an anti-sway bar interconnected between the suspension units of each wheel.

Although the suspension system shown in FIG. 1 would be capable of accommodating sway movement of the trailer 10, under certain side-to-side driving situations, such as on hills, an anti-sway bar 58 can be connected between the cam members 42 as shown in FIG. 7. The anti-sway bar 58 is a pre-stressed flexible member that is capable of maintaining the trailer 10 in a stable position during extreme side-to-side motion.

We claim:

1. A suspension apparatus for a wheel of a vehicle having a frame and a flexible member connected to the frame, said suspension apparatus comprising:
   wheel deflection means for deflecting the wheel in an arcuate path when a predetermined load is applied to the vehicle; and
   flexible member deflection means interconnectable to the wheel deflection means for deflecting the flexible member when the wheel moves along said arcuate path, wherein the flexible member deflection means includes a contact means positioned at approximately a longitudinal mid-point on the flexible member.

2. The suspension apparatus of claim 1, wherein the wheel deflection means includes a swing member means pivotally connected to the contact means at one end and adapted to connect to an axle of the wheel of the vehicle at the other end.

3. The suspension apparatus of claim 2, wherein the contact means includes a cam member having a flexible member engaging surface.

4. The suspension apparatus of claim 3, wherein the flexible member engaging surface includes a gradually curving portion.

5. The suspension apparatus of claim 4, wherein the flexible member engaging surface further includes a substantially flat portion preceding the gradually curving portion.

6. A suspension apparatus for a wheel of a vehicle having a frame and a flexible member connected to the frame, said suspension apparatus comprising:
   shaft means rotatably mounted to the frame;
   contact means connected to the shaft and positioned to deflect the flexible member when the vehicle is loaded; and
   swing member means pivotally connected to the shaft at one end and adapted to connect to an axle of the wheel of the vehicle at the other end, such that when the vehicle is subjected to a load the wheel is deflected which causes the swing member means to rotate the shaft means such that the contact means deflects the flexible member.

7. The suspension apparatus of claim 6, wherein the shaft means includes a rod mounted to the frame by a pair of bearing mounts, such that the rod can rotate about its longitudinal axis.

8. The suspension apparatus of claim 6, wherein the contact means includes a cam member having a flexible member engaging surface.

9. The suspension apparatus of claim 7, wherein the contact means is located at approximately a longitudinal mid-point of the flexible member.

10. The suspension apparatus of claim 8, wherein the flexible member engaging surface includes a gradually curving portion.

11. The suspension apparatus of claim 10, wherein the flexible member engaging surface further includes a substantially flat portion preceding the gradually curving portion.

12. The suspension apparatus of claim 8, wherein an XT/XS ratio is greater than 1, wherein XT is defined as a distance between an axis of rotation of the cam member and the axle of the wheel, and XS is defined as a distance between the axis of rotation of the cam member and a load point on the cam member defined by a point of contact between the flexible member engaging surface of the cam member and the flexible member.

13. The suspension apparatus of claim 12, wherein the XT/XS ratio is greater than 4 and less than 20.

14. The suspension apparatus of claim 6, further including a damping means connected between the contact means and the frame of the trailer.

15. The suspension apparatus of claim 14, wherein the damping means includes a shock absorber.

16. A suspension system for a trailer having a frame, a pair of flexible members connected to the frame and a pair of wheels each having an axle, said suspension system comprising a pair of suspension units for independently connecting each wheel to the frame, said suspension unit comprising:
   a cam shaft rotatably mounted to the frame of the trailer;
   a cam member connected to the cam shaft and positioned to deflect one of the flexible members when the trailer is loaded; and
   a swing arm connected at one end to the cam shaft and at the other end to the axle of one of the wheels, such that when the trailer is subjected to a load one of the wheels is deflected which causes the swing arm to rotate the cam shaft such that the cam member deflects one of the flexible members.

17. The suspension system of claim 16, wherein the cam member includes a flexible member engaging surface.

18. The suspension apparatus of claim 16, wherein the cam member is located at approximately a longitudinal mid-point of one of the flexible members.

19. The suspension system of claim 17, wherein the flexible member engaging surface includes a gradually curving portion.

20. The suspension apparatus of claim 19, wherein the flexible member engaging surface further includes a substantially flat portion preceding the gradually curving portion.

21. The suspension apparatus of claim 17, wherein an XT/XS ratio is greater than 1, wherein XT is defined as a distance between an axis of rotation of the cam member and the axle of one of the wheels, and XS is defined as a distance between the axis of rotation of the cam member and a load point on the cam member defined by a point of contact between the flexible member engaging surface of the cam member and one of the flexible members.

22. The suspension apparatus of claim 21, wherein the XT/XS ratio is greater than 4 and less than 20.

23. The suspension system of claim 16, further including a damping means connected between the cam member and the frame of the trailer.

24. The suspension system of claim 23, wherein the damping means includes a shock absorber.

25. The suspension system of claim 16, further including an anti-sway means connected between the individual suspension units of the pair of wheels.

26. The suspension system of claim 25, wherein the anti-sway means includes a flexible bar.

* * * * *